United States Patent [19]
Fox et al.

[11] Patent Number: 6,067,166
[45] Date of Patent: May 23, 2000

[54] APPARATUS FOR MOUNTING AN ELECTRO OPTICAL MEASURING DEVICE, ESPECIALLY A COLORIMETER ON A MONITOR

[75] Inventors: William Fox, Rochester; Robert Hutchison, Pittsford; Cormic Merle, Rochester, all of N.Y.; Terry Satterthwaite, Carlsbad, Calif.

[73] Assignee: CV US, Inc., Lawrenceville, N.J.

[21] Appl. No.: 09/373,877

[22] Filed: Aug. 12, 1999

[51] Int. Cl.⁷ ..................................................... G01J 3/51
[52] U.S. Cl. ........................ 356/402; 348/191; 250/226
[58] Field of Search .................................. 356/402, 218, 356/225; 348/182, 184, 185, 189, 191; 250/226

[56] References Cited

U.S. PATENT DOCUMENTS 5,270,540  12/1993  Skop, Jr. et al. .................. 250/239
5,371,537  12/1994  Bohan et al. ..................... 356/218
5,892,585   4/1999  Lianza et al. ..................... 356/405

Primary Examiner—F. L. Evans

[57] ABSTRACT

A mounting for a colorimeter enables it to make measurements of light emanating from a color monitor screen without affecting the colors produced by the screen or allowing the entry of ambient light which can affect measurements by the calorimeter. Pressure applied against a screen, especially of an LCD color monitor, can cause changes in the color of the light emanating from the screen. The mounting apparatus conforms to the screen, and seals the screen against ambient light entering into the calorimeter, while limiting the pressure against the screen. The apparatus is provided by a plate of compliant material, having an opening to which the calorimeter is attached. The surface of the plate, is disposed against the screen of the monitor. Since the pad is compliant, it seals the colorimeter from entry thereinto of ambient light. A strap can be expanded, and holds the pad on the monitor and against the screen. The strap is attached to the plate, and is placed around the back of the monitor.

11 Claims, 6 Drawing Sheets

APPARATUS FOR MOUNTING AN ELECTRO OPTICAL MEASURING DEVICE, ESPECIALLY A COLORIMETER ON A MONITOR

The present invention relates to apparatus for mounting an electro-optical measuring device upon against the screen of a monitor, especially a color monitor, so as to enable accurate measurements without interfering with the operation of the monitor, as can occur when pressure is applied to the screen, and also which seals the colorimeter from ambient light.

Colorimeters are conventionally attached to a screen by means of suction cups. Such suction cups can provide excessive pressure if placed against the screen. In the case of LCD (liquid crystal display) monitors, pressure against the liquid crystal material can affect the colors which are produced. For accurate color measurements, the LCD monitor must be shielded against ambient light. Providing such shielding while minimizing the pressure applied to the screens are conflicting requirements, which have not hereto been accomplished.

Accordingly, the invention provides an improved mounting for an electro-optical measuring device, especially a colorimeter, against color monitor screens which has the following features: (a) shields the screen from ambient light; (b) mitigates the application of pressure against the screen which can adversely affect its operation, and (3) is convenient to use and install.

Briefly described, a mounting for an electro optical device against a monitor screen utilizes a plate having an outer surface. This surface is provided by compliant material which is softer than the screen and conforms to the screen to prevent ambient light from reaching the device. The device is received in an opening in the plate. The opening is provided by material, preferably rubber-like foam, which hold the device in the plate. The opening desirably has features, which both hold and locate the device spaced from the screen so that the device does not touch the screen. A strap, preferably of elastic material, is attached at its opposite ends to edges of the plate and yieldably holds the plate with the device therein on the monitor so that the outer surface thereof is pressed against, and conforms to, the screen.

The foregoing and other objects, features and advantages of the invention, as well as a presently preferred embodiment thereof will become more apparent from a reading of the following description in connection with the accompanying drawings in which.

Figure 1:
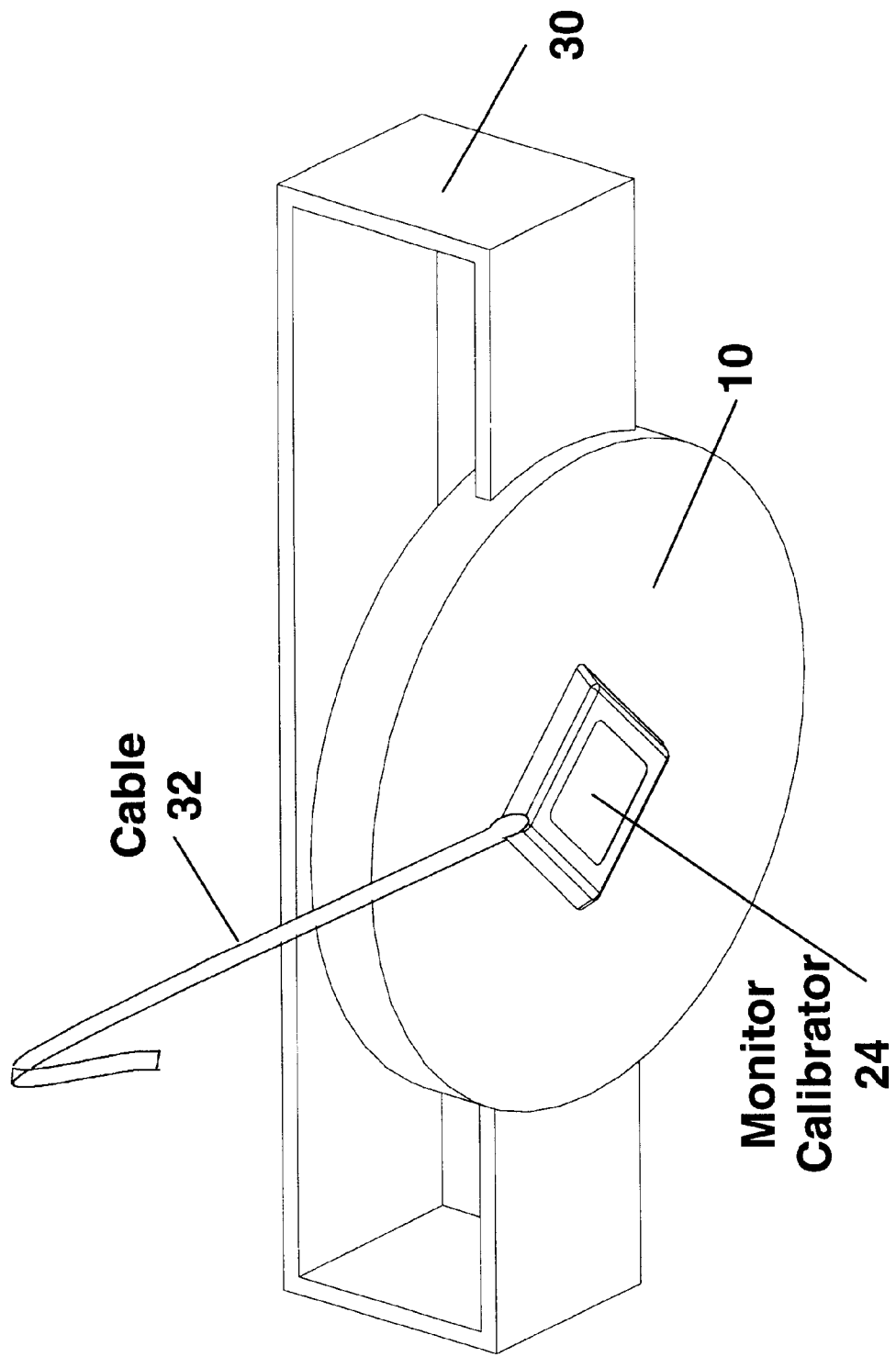
FIG. 1 is a perspective view illustrating the mounting apparatus provided by the invention with a calorimeter installed therein.
Figure 2:
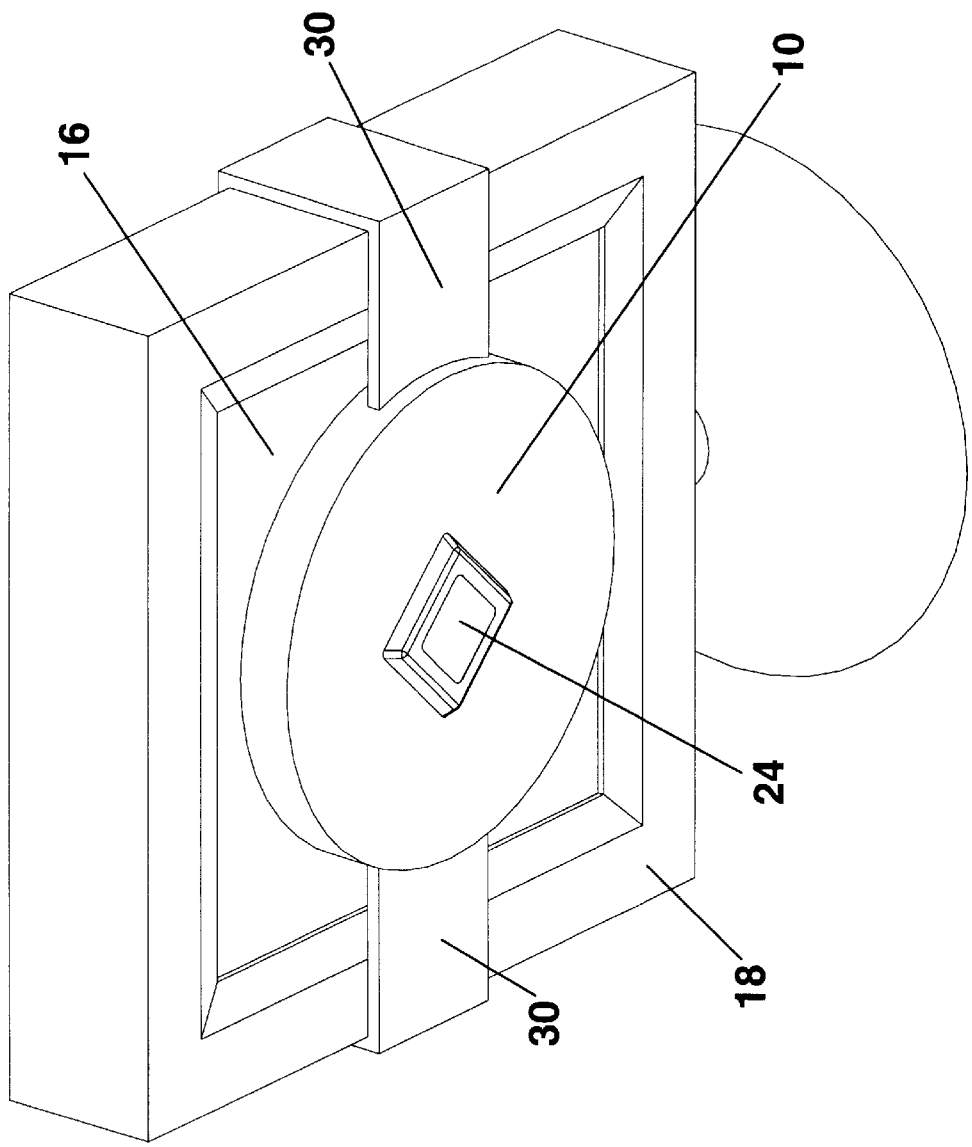
FIG. 2 is a perspective view illustrating the mounting apparatus installed on a monitor.
Figure 3:
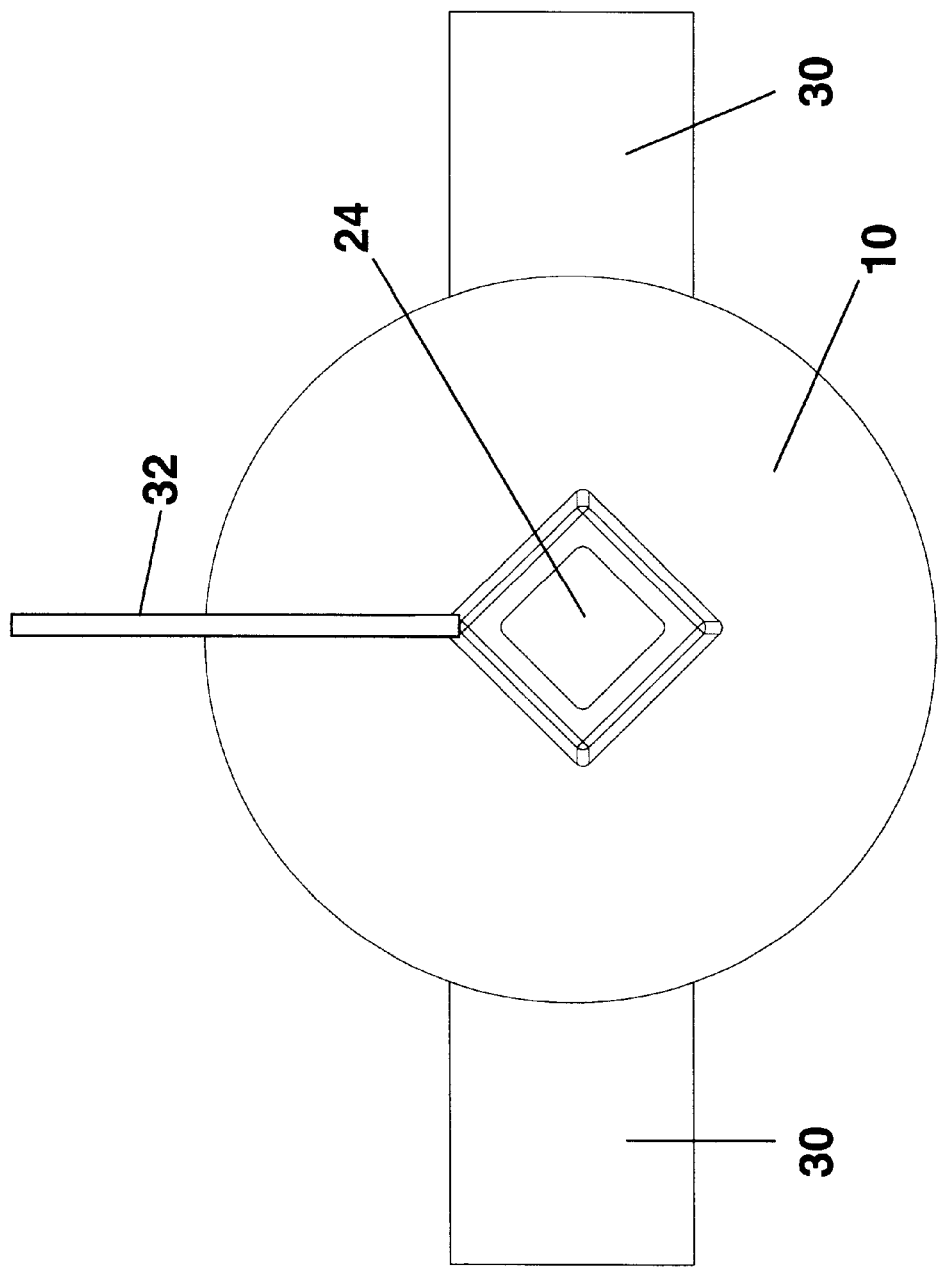
FIGS. 3 and 4 are outside plan and edge views of the apparatus illustrated in FIGS. 1 and 2.
Figure 4:
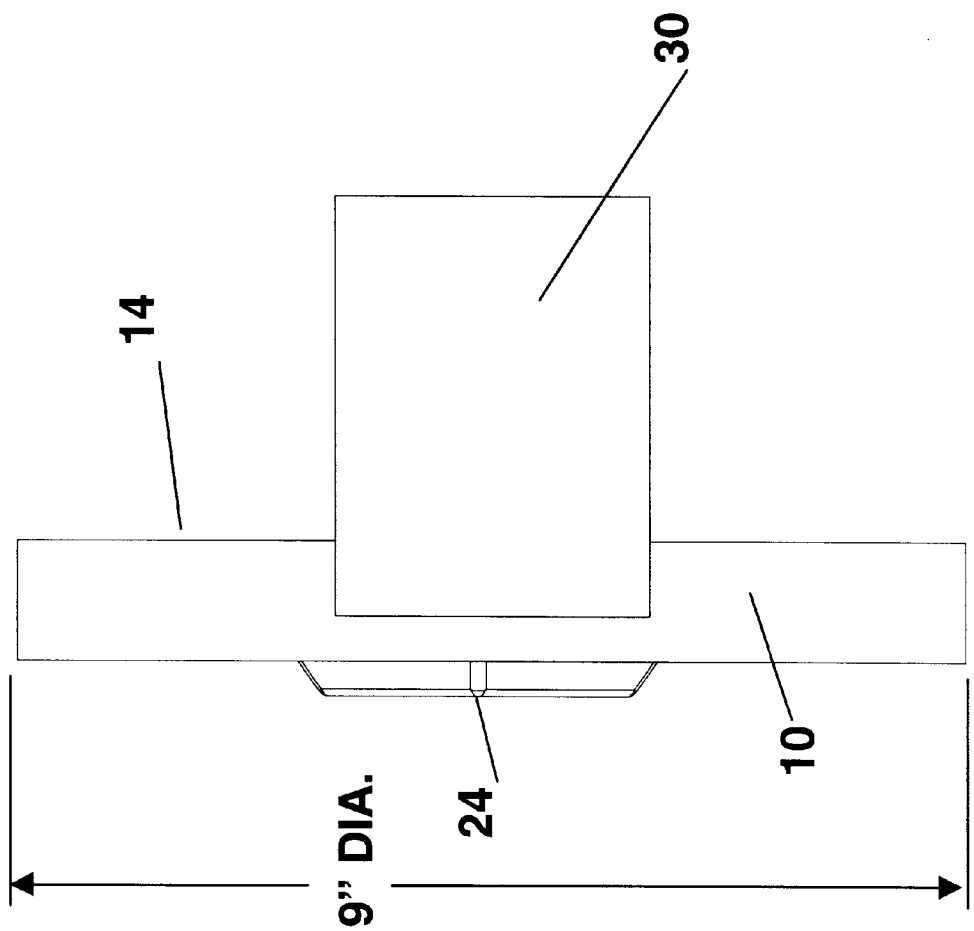
Figure 5:
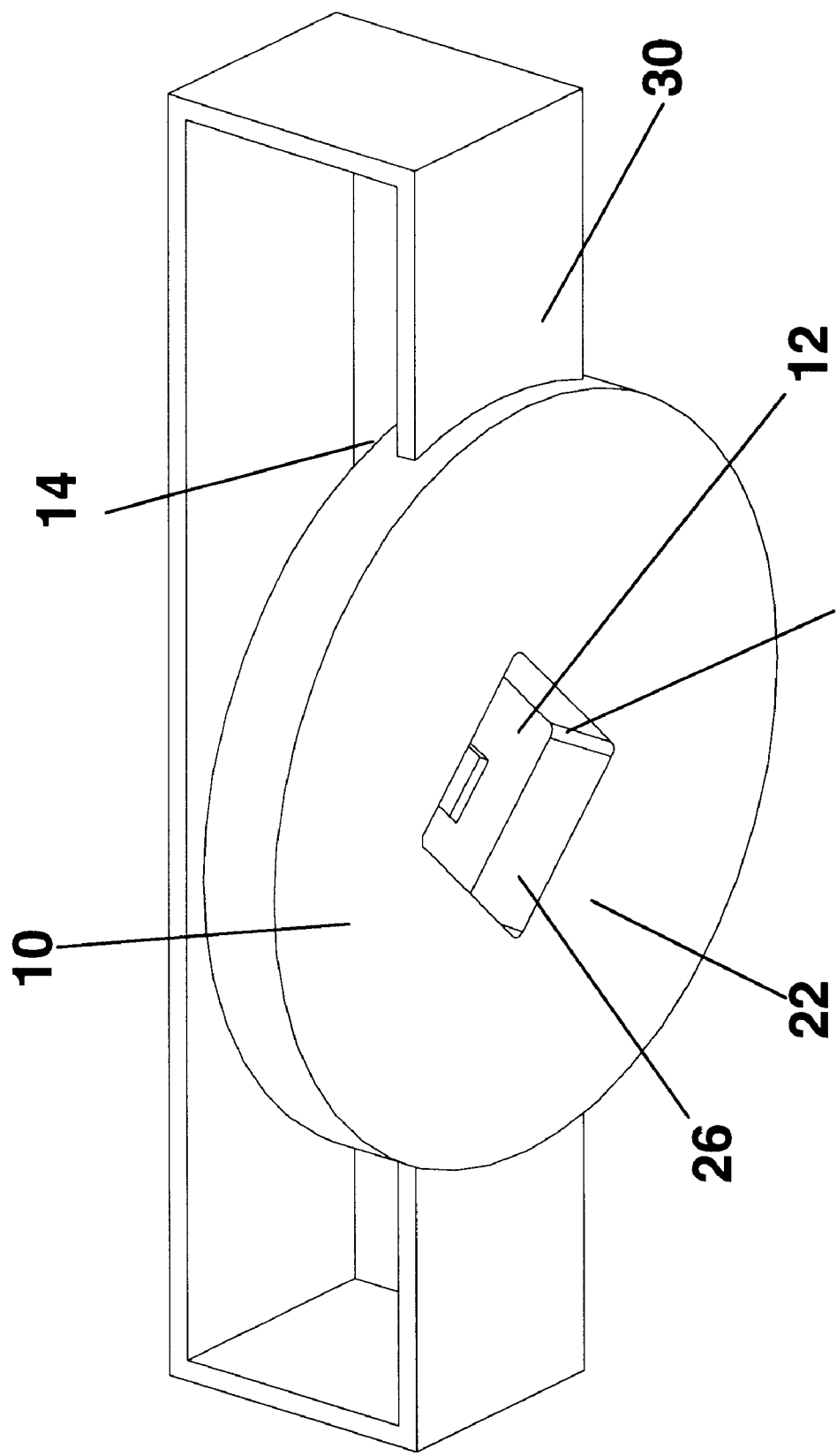
FIG. 5 is a perspective view illustrating the apparatus before the colorimeter is mounted therein.

Referring to the drawings, there is shown a plate or pad 10 in the form of a disk of compressible material such as rubber. The material of the disk is preferably foam and may be provided by three layers. These are a forward layer 12 which presents a soft pad 10 and is disposed with its outer surface 14 (also the outer surface of the pad 10) against and in conforming relationship to the screen 16 of a color monitor 18. The material of this pad may be foam rubber. A suitable material, presently preferred is "Custom Felt" polyurethane foam, 7–8 lb./cu. ft. (density) 105PSI tensile strength, 2 PSI for 25% compression. Next, in laminated relationship, as for example, by being adhesively attached to each other, is an intermediate layer 20 which is of compressible material and is preferably harder, for example, by being made of greater density foam, than the forward layer 12. A presently preferred material may be "Custom Felt" polyurethane foam—14–15 lb./cu. ft. (density) 195 PSI tensile strength, 14 PSI for 25% compression.

Figure 6:
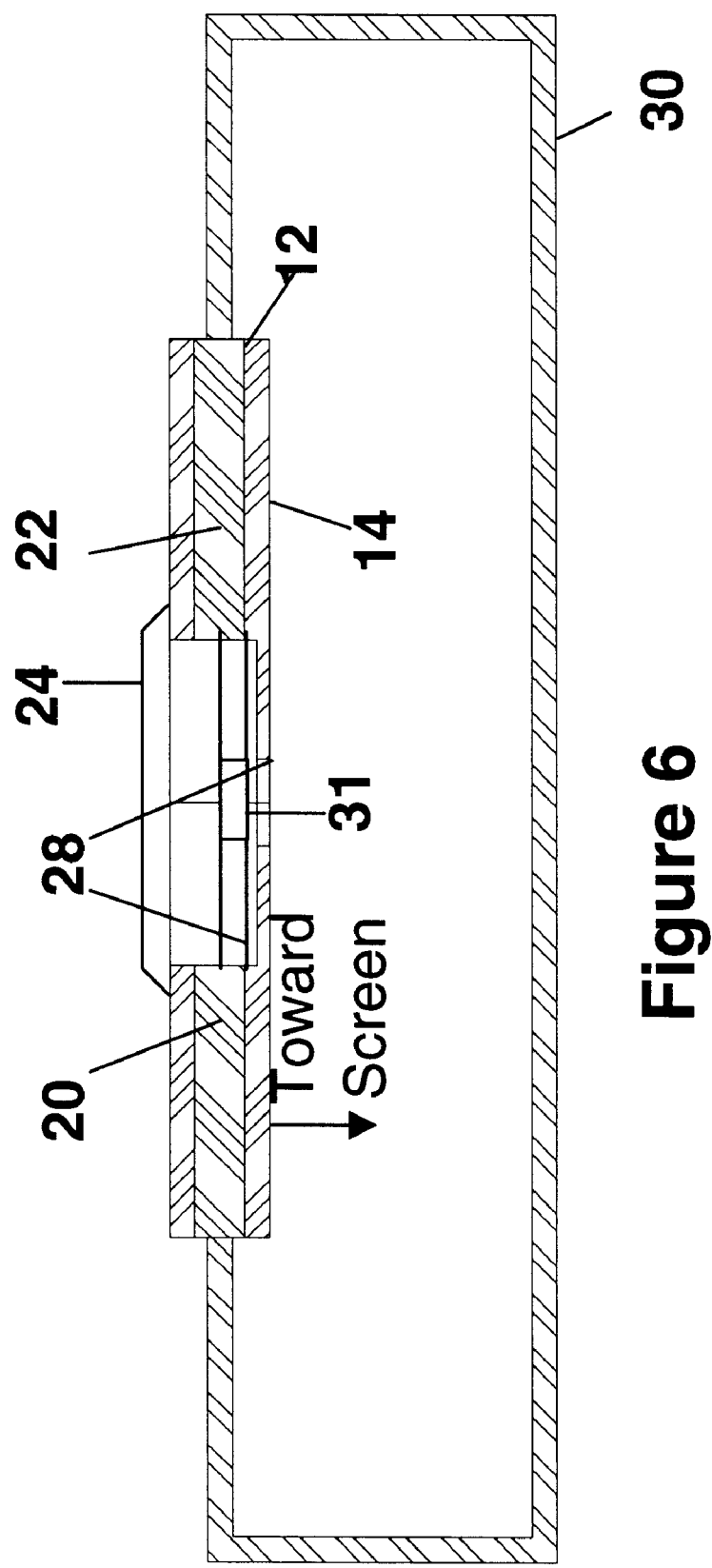
FIG. 6 is sectional view along a diameter of the device shown in the above-described figures.

An outer layer 22 may also be of compliant material, such as foam of the same hardness or density as the forward layer 12. The material may be the same as for the forward layer 22. A colorimeter 24 is received in an opening 26 in the disk 10. The central layer 20 may have features not shown on its periphery which locates the calorimeter 24 with its forward surface 31 spaced from the outer surface 14 of the pad 10. As shown in FIG. 6 the pad 10 is shaped to provide a shelf which locates the colorimeter 24, spaced as aperture 29 is provided via which light from the screen 16 enters the colorimeter 24. The "Custom Felt" material is available commercially for example from Foamex Corp., of Eddystone, Pa., USA.

An elastic strap or band 30 has its opposite ends attached, preferably to the intermediate layer 20 along the peripheral outer edge of the pad 10. Instead of an elastic band, two straps may be used which may be joined by Velcro (hook type), or snap together, fasteners which enable the straps to be pulled to tighten it on the monitor. The band enables the disk 10 and the colorimeter 24 mounted thereon to be held against the screen 16 of the monitor 18. Because the pad 10, and especially its forward layer 12 and the surface 14 is compliant, the pad conforms to the surface of the screen and provides a light shield. In the exemplary case shown, the pad 10 is a disk nine inches in diameter and the screen may be an 8×12 inch screen. The strap 30 may be a 3 inch wide grade 700 cotton gabardine, woven elastic, 100% stretch factor. Available from HNW, Northvale, N.J., USA.

The colorimeter does not use any suction pads, although it may have facility for receiving such suction cups when it is desired to mount the calorimeter directly on a screen which is capable of tolerating the pressure imposed by the cups. In this embodiment, the shelf 28 may have sufficient porosity to allow attachment by suction cups, as by being PVC coated for suction cup adhesion. An electric cable 32 extends from the colorimeter and may be connected to other apparatus for using the measurement signals obtained with the colorimeter. The colorimeter may be a monitor or calibrator or, such as described in copending application, Ser. No. 09/360,051 filed Jul. 23, 1999 in the name of Robert Hutchison, one of the inventors hereof, and others.

From the foregoing description, it will be apparent that there has been provided improved mounting apparatus for safely and conveniently mounting an electro-optical measuring device, especially a colorimeter or monitor calibrator, on a color monitor so as to measure light emanating from the screen thereof. Variations and modifications in the herein described apparatus, within the scope of the invention, will undoubtedly suggest themselves to those skilled in the art. Accordingly, the foregoing description should be taken as illustrative and not in a limiting sense.

What is claimed is:

1. A mounting for an electro-optical measuring device on a monitor screen which comprises a plate having a forward surface, said forward surface being provided by complaint material, an opening in said plate for receiving said device, said opening being provided by compressible material which exerts holding force against said device for holding said device in said opening, and a band of elastic material attached at opposite ends thereof to said plate for holding said plate with said forward surface thereof against and in conforming relationship with said screen.

2. The mounting according to claim 1 wherein said device is a colorimeter having a forward surface into which light from said screen enters for measurement.

3. The mounting according to claim 2 wherein said opening has features which locate said colorimeter in said opening with said forward surface of said colorimeter spaced from said screen.

4. The mounting according to claim 3 wherein said plate has a plurality of layers, a first of said layers providing said forward surface, a second of said layers on the outside of said plate providing an entrance for said calorimeter, a third layer, intermediate said first and second layers at least one of said layers being a shelf which provides said features and which locates said device with said forward surface thereof spaced from said forward surface of said plate.

5. The mounting according to claim 4 wherein at least said third layer is of yieldable material which compresses when said device is located in said opening to exert said holding force.

6. The mounting according to claim 5 wherein said material which compresses is harder than the material of said first layer.

7. The mounting according to claim 4 wherein the material of said layers is an elastic foam.

8. The mounting according to claim 7 wherein said foam material is a material selected from the group consisting of latex, rubber and polyurethane.

9. The mounting of claim 1 wherein said plate is a pad and said forward surface is sufficiently compliant to shield said opening against entry of ambient light into said opening.

10. A mounting for an electro-optical measuring device having a light entry area on a monitor screen and comprising a plate of compliant material having an opening with an aperture, said device being attached to said plate with said entry area thereof exposed to said screen via said aperture, a tensionable strap attached to said plate and extendable over said monitor holding said plate and said device on said screen with said plate against said screen and in conforming relationship thereto to provide an ambient light shield around said opening.

11. The mounting according to claim 10 wherein said monitor is an LCD monitor having LCDs which provide said screen.

\* \* \* \* \*